(12) United States Patent
Clauwaert

(10) Patent No.: US 10,954,333 B2
(45) Date of Patent: Mar. 23, 2021

(54) METAL-BEARING URETHANIZED POLYMER SOLUBLE IN A LOW-VOLATILE ORGANIC COMPOUND SOLVENT

(71) Applicant: EGE KIMYA SANAYI VE TICARET A. S., Kagithane/Istanbul (TR)

(72) Inventor: Eddy Clauwaert, Bruges (BE)

(73) Assignee: EGE KIMYA SANAYI VE TIC ARET A.S., Kagithane/Istanbul (TR)

( * ) Notice: Subject to any disclaimer, the term of this patent is extended or adjusted under 35 U.S.C. 154(b) by 178 days.

(21) Appl. No.: 15/776,023

(22) PCT Filed: Nov. 11, 2016

(86) PCT No.: PCT/TR2016/050436
§ 371 (c)(1),
(2) Date: May 14, 2018

(87) PCT Pub. No.: WO2017/082848
PCT Pub. Date: May 18, 2017

(65) Prior Publication Data
US 2018/0327539 A1    Nov. 15, 2018

(30) Foreign Application Priority Data

Nov. 13, 2015 (TR) .................. 2015 14310
Dec. 29, 2015 (TR) .................. 2015 17284

(51) Int. Cl.
| | | |
|---|---|---|
| C08G 18/75 | (2006.01) | |
| C09D 175/04 | (2006.01) | |
| C08G 18/38 | (2006.01) | |
| C08G 18/36 | (2006.01) | |
| C09D 7/65 | (2018.01) | |
| C08G 18/34 | (2006.01) | |
| C08K 3/22 | (2006.01) | |

(52) U.S. Cl.
CPC ......... *C08G 18/755* (2013.01); *C08G 18/341* (2013.01); *C08G 18/348* (2013.01); *C08G 18/36* (2013.01); *C08G 18/3897* (2013.01); *C08K 3/22* (2013.01); *C09D 7/65* (2018.01); *C09D 175/04* (2013.01); *C08K 2003/2206* (2013.01); *C08K 2003/2262* (2013.01); *C08K 2003/2265* (2013.01); *C08K 2003/2289* (2013.01)

(58) Field of Classification Search
CPC .. C08G 18/755; C08G 18/36; C08G 18/3897; C08G 18/348; C08G 18/341; C08K 3/22; C08K 2003/2289; C08K 2003/2265; C08K 2003/2262; C08K 2003/2206; C09D 7/65; C09D 175/04
See application file for complete search history.

(56) References Cited

U.S. PATENT DOCUMENTS

| | | | |
|---|---|---|---|
| 3,410,815 | A | 11/1968 | Phillips et al. |
| 5,053,464 | A | 10/1991 | Shirai et al. |
| 5,681,915 | A | 10/1997 | Lechner et al. |
| 10,465,035 | B2 * | 11/2019 | Clauwaert .............. C08G 18/36 |
| 2006/0014865 | A1 | 1/2006 | Allard et al. |
| 2006/0167124 | A1 | 7/2006 | Bernard et al. |
| 2007/0167603 | A1 | 7/2007 | Urbano et al. |
| 2008/0146748 | A1 | 6/2008 | Blum et al. |
| 2009/0233103 | A1 | 9/2009 | Chung et al. |
| 2012/0041133 | A1 | 2/2012 | Clauwaert |

FOREIGN PATENT DOCUMENTS

| | | |
|---|---|---|
| DE | 44 34 694 C1 | 3/1996 |
| EP | 1 057 857 A2 | 12/2000 |
| EP | 1 471 123 A1 | 10/2004 |
| EP | 1 923 411 A2 | 5/2008 |
| EP | 2 370 534 | 10/2011 |
| GB | 550441 A | 1/1943 |
| GB | 1 232 194 A | 5/1971 |
| JP | 2005-002292 A | 1/2005 |
| JP | 2008-194839 A | 8/2008 |
| TW | 200906878 A | 2/2009 |
| WO | WO 2004/050776 A1 | 6/2004 |
| WO | WO 2010/076031 A1 | 7/2010 |
| WO | WO 2011/098583 A1 | 8/2011 |
| WO | WO 2012/000934 A1 | 1/2012 |
| WO | WO 2014/137307 A1 | 9/2014 |

OTHER PUBLICATIONS

Bieleman, Johan, "Additives for Coatings", Wiley-VCH, Weinheim, 2000, pp. 202-211.
Internet Publication, "Isocyanates", retrieved from web Jul. 31, 2015, 6 pages, URL: www.poliuretanos.com.br/Ingles/Chapter1/131Isocyanates.htm.

\* cited by examiner

Primary Examiner — Rabon A Sergent
(74) Attorney, Agent, or Firm — Birch, Stewart, Kolasch & Birch, LLP

(57) ABSTRACT

The present disclosure relates to polymer compounds for use as polymerization agents in coatings, paints or inks. In one embodiment, a polymer compound comprises a metal-bearing urethanized polymer having a metal content greater than 6% by weight, and a water solubility below 20 mg/l according to OECD 105, wherein the urethanized polymer is soluble in a low-volatile organic compound (low-VOC) solvent. Methods of producing and using such polymer compounds are also disclosed.

16 Claims, 3 Drawing Sheets

METAL-BEARING URETHANIZED POLYMER SOLUBLE IN A LOW-VOLATILE ORGANIC COMPOUND SOLVENT

TECHNICAL FIELD

The present disclosure relates to polymers, and in particular to polymers used in coatings, paints, and inks.

BACKGROUND

As the drying rate of uncatalyzed air-drying systems, such as alkyd paints, is too slow for commercial applications, it is common practice to accelerate the drying process by adding metal driers to the system. Without driers, a typical alkyd paint may take as long as days, if not weeks to dry, which is clearly undesirable for most applications.

Primary driers catalyze the formation and/or decomposition of peroxides, which are formed by the reaction of oxygen with the air-drying binder or drying oil. Metal carboxylates, and in particular cobalt carboxylates, have hitherto been the principal constituents of driers, at least if drying has to take place at room temperature and within a reasonable time. The use of cobalt carboxylates, and in particular of cobalt octoates have been widely described, and is common practice throughout the paint industry (e.g., see J. H. Bieleman, in Additives for Coatings, ED. J. H. Bieleman, Wiley NCH, Weinheim, 2000, p. 202).

Nevertheless cobalt has shown carcinogenic effects on in vivo inhalation tests. It is generally assumed that this toxicity is related to the cobalt ion, as the tested compounds had relatively high water solubility and generated appreciable cobalt ion concentrations. The available data for most of the standard cobalt carboxylates is such that serious concern about their carcinogenicity is justified, which makes their future use as driers in auto-oxidative paint and ink systems problematic.

Whereas the cobalt carboxylate is a primary drier, other transition metals such as manganese also fulfill a role in this process. The effect of manganese carboxylates is most noticeable at higher temperatures, or else at room temperature when used as an auxiliary drier with cobalt. The higher temperatures needed for the development of the catalytic activity of manganese as a primary drier are around 80° C., conditions normally found on printing presses. Hence, manganese driers are used in these applications.

Although manganese is an essential component of life, e.g., as the central atom in Super Oxide Dismutase (SOD'S), there is a known toxicology on manganese compounds. Manganese carboxylates have not been classified as yet, but it has been demonstrated that manganese carboxylates release manganese ions in aqueous solutions. Concern about the future classification of manganese carboxylates is therefore justified.

It is known that the application of printing inks on fast running rotary printing presses causes the formation of an airborne aerosol of fine ink droplets around the printing press. As the primary risk to workers is therefore absorption through inhalation, it is important to lower the water solubility, and hence the release of metal ions at the pH values typically found in lung fluids, which is around neutral.

As noted above, metal carboxylates are used in a broad range of applications, with special importance in the paint and varnish industry, where they are used as driers and rheological modifiers, as accelerators for unsaturated polyesters, as lubricating oil additives, as biocides, and more.

Thus, although metal carboxylates have had a wide range of uses and applications, the introduction of stricter regulations for chemicals in general has made the future uncertain, and in particular for certain metal carboxylates, such as for the cobalt and manganese compounds, where unacceptable toxic profiles are suspected.

It has been found that the toxicity of these compounds is related to the water solubility. High water solubility, together with subsequent hydrolysis, gives elevated concentrations of the metal ions in aqueous media. It has to be remembered that this higher metal ion concentration will occur in biological fluids which in turn will increase the probability of toxic effects.

It is possible to reduce the water solubility, and additionally the resulting metal ion concentration, by including the metal atom into a polymeric structure. The increased molecular weight with the more complex molecular structure reduces the water solubility of the compounds so that the threshold values for toxicity are not attained.

However, prior polymer compounds with reduced water solubility of toxic metal ion concentrations had several technical problems and disadvantages. A first technical problem and disadvantage was a limitation on the metal content that could be obtained while still having usable viscosity levels. For example, prior metal content for cobalt and manganese was typically below 6% by weight, thereby placing a limitation on the catalytic, drying, modifier, and/or accelerator function of the polymer compound. A second disadvantage was a limitation on the viscosity of the polymer compound solution, which was typically high compared to classical products, thereby limiting the choice of solvent for the product to very strong solvents, such as glycol derivatives, which themselves are substances of concern due to their toxicological properties.

Thus, there is still a need in the art for polymerization agents for use in coatings, paints, or inks, that have a higher metal content, lower viscosity, and solubility with an environmentally-friendly "green" solvent, such as a low-volatile organic content (low-VOC) solvent.

BRIEF DESCRIPTION

The present disclosure provides for a new class of metal-bearing urethanized polymer compounds, which retain the catalytic effects of the metal towards the oxidative drying of polymers with a higher metal content than previously available, while also greatly avoiding toxic effects by reducing the availability of the metal ions in aqueous systems and solvating in a low-VOC solvent. In one embodiment, hydroxy acids are polymerized with divalent metal ions and then further reacted with isocyanates. In another embodiment, hydroxy acids with carboxylic acids are polymerized with divalent metal ions and then further reacted with isocyanates.

In accordance with one embodiment disclosed herein, a polymer compound comprises a metal-bearing urethanized polymer having a metal content greater than 6% by weight, and a water solubility according to OECD 105 below 20 mg/l, wherein the urethanized polymer is soluble in a low-volatile organic compound (low-VOC) solvent. Advantageously, the polymer compound of the present invention is soluble in an environmentally-friendly "green" solvent, which in one example may be bioderived, biodegradable, and/or have a low VOC content. Thus, the urethanized polymer compound of the present invention greatly avoids toxic effects by reducing the availability of the metal ions in aqueous systems and being soluble in a "green" (e.g., biodegradable) and low-VOC solvent, while providing for increased metal content for enhanced catalytic, drying, modifier, and/or accelerator functionality.

In accordance with another embodiment, a polymer compound includes a metal-bearing urethanized polymer having the following formula:

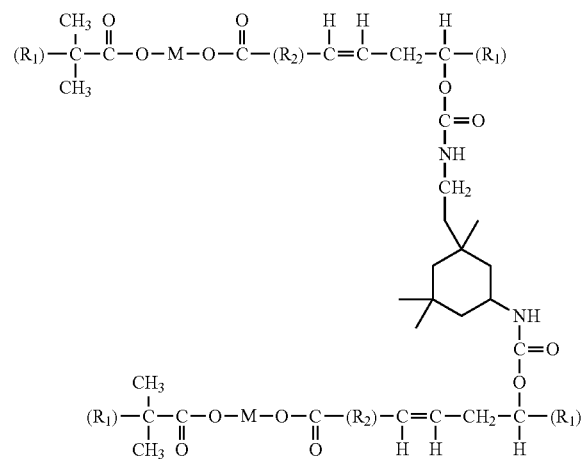

wherein M is a metal, $R_1$ is a first alkyl group, and $R_2$ is a second alkyl group.

The present disclosure also pertains to a series of metal-bearing compounds for use as driers in coatings, paints and inks. In one embodiment, a metal-bearing urethanized polymer as described above and herein is dissolved in a low-VOC solvent, wherein the low-VOC solvent is at least one member from the group comprised of lactate esters (e.g., ethyl lactate, methyl lactate, or another ester of lactic acid with an alcohol), fatty acid esters (e.g., butyl linoleate), or any applicable combination of the aforementioned solvents.

Another embodiment disclosed herein pertains to a series of coating, paint and ink compositions comprising the polymer compound as described above and herein as a curing catalyst. In one embodiment, a composition includes a metal-bearing urethanized polymer as described above and herein mixed with an unsaturated fatty acid modified polymer-based binder.

Also described herein is a process for preparing the polymer compounds of the present disclosure. In one embodiment, a process for preparing a polymer compound includes mixing a hydroxy acid and a carboxylic acid to form a mixture, and reacting the mixture with a metal hydroxide to form an intermediate product. The process further includes polymerizing the intermediate product with an isocyanate to form a metal-bearing urethanized polymer having a metal content greater than 6% by weight, and a water solubility according to OECD 105 below 20 mg/l, wherein the urethanized polymer is soluble in a low-VOC solvent.

Further described herein is a process for curing a polymer-based coating composition. In one embodiment, a method of curing a polymer-based coating composition includes providing a polymer compound including a metal-bearing urethanized polymer having a metal content greater than 6% by weight, and a water solubility according to OECD 105 below 20 mg/l, wherein the urethanized polymer is soluble in a low-VOC solvent. The method further includes mixing the polymer compound with an unsaturated fatty acid modified polymer-based binder, and then drying a coating of the mixture of the polymer compound and the binder.

Yet another embodiment pertains to the use of the polymer compounds as described above and herein as a curing catalyst for hardening of unsaturated polyesters.

Within the scope of the present invention, the following descriptions are applicable as alternatives in a functioning combination with all the embodiments of the polymer compounds described: the urethanized polymer is soluble in printing inks including hydrocarbon resins, alkyd resins, or any combination thereof; the low-VOC solvent is an ester solvent; the ester solvent is at least one member from the group consisting of a lactate ester, a fatty acid ester, and any combination thereof; the metal is an integral part of a backbone of the polymer compound; the metal is selected from the group consisting of cobalt, manganese, calcium, bismuth, strontium, and iron; the metal is cobalt or manganese and the metal content is between 6% and 8% by weight; the urethanized polymer is soluble with the low-VOC solvent to form a mixture having an overall viscosity less than 3000 cP at 20° C.; the urethenized polymer has a mean molecular weight less than 2000 Da; the urethanized polymer is formed at least in part from a hydroxy acid, a saturated carboxylic acid, a metal hydroxide, and an isocyanate; the hydroxy acid is ricinoleic acid, the carboxylic acid is neodecanoic acid, the metal hydroxide is cobalt hydroxide or manganese hydroxide, and the isocyanate is isophorone diisocyanate (IPDI); and any applicable combination thereof.

It is noted that the various components that make up the polymer compound or the various components that describe the polymer compound disclosed above and herein can be alternatives which may be combined in various applicable and operable combinations within the scope of the present invention.

Advantageously, the polymer compounds and process for preparing the polymer compounds as disclosed herein have resulted in a narrower molecular weight distribution in the polymer compound, thereby providing polymer compounds with better solubility and hence lower viscosity in the same solvent. Furthermore, the choice of suitable solvents has become much larger than previously possible, such that environmentally-friendly solvents with low-VOC content can now be used.

BRIEF DESCRIPTION OF THE DRAWINGS

These and other features, aspects, and advantages of the present invention will become better understood when the following detailed description is read with reference to the accompanying drawings in which like characters represent like parts throughout the drawings. Unless noted, the drawings may not be drawn to scale.

DETAILED DESCRIPTION OF THE EMBODIMENTS

Compounds

Figure 1A:
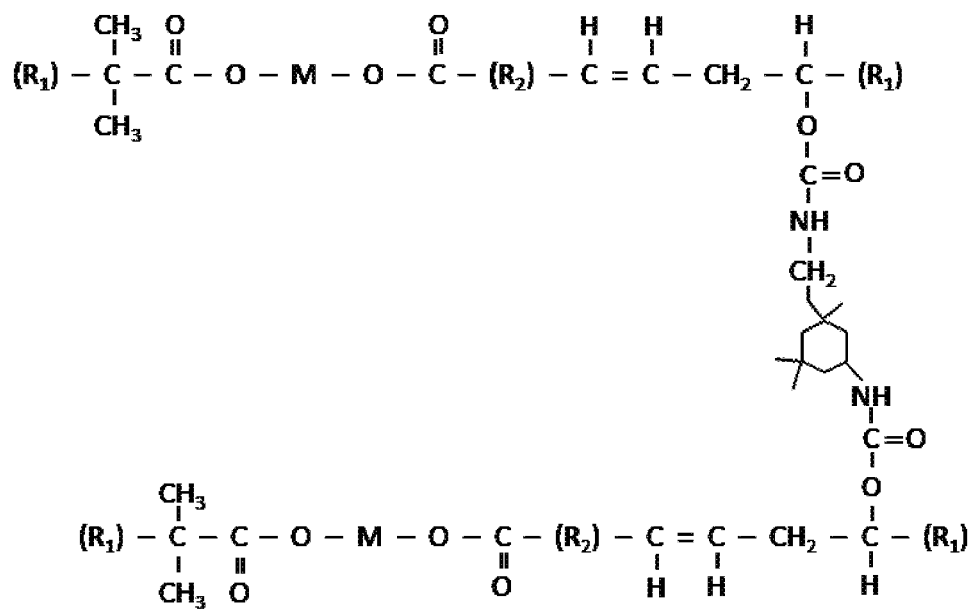
FIGS. 1A and 1B illustrate a general structure and an example structure, respectively, of the class of polymer compounds in accordance with an embodiment as described in the present disclosure.

Referring now to FIG. 1A, a general structure of the class of metal-bearing polymer compounds is shown in accordance with an embodiment as described in the present disclosure. As noted above, the present disclosure pertains to a series of metal-bearing compounds for use as driers, accelerators, and other various functions in coatings, paints and inks.

The general structure of a metal-bearing polymer compound in accordance with an embodiment includes a metal M and alkyl groups $R_1$ and $R_2$ as shown in FIG. 1A. In one example, the metal M may include one of cobalt, manganese, calcium, bismuth, strontium, and iron, $R_1$ may include an alkyl group of six carbon atoms, and $R_2$ may include an alkyl group of seven carbon atoms.

Figure 1B:
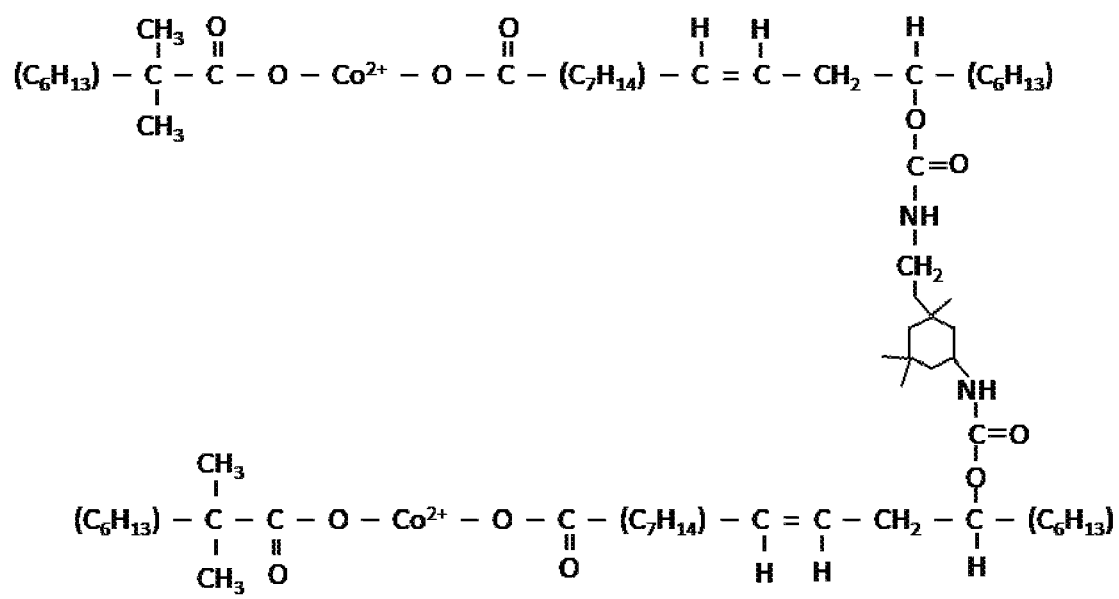

FIG. 1B illustrates an example structure of a metal-bearing polymer compound in accordance with an embodiment as disclosed in the present disclosure. M is $Co^{2+}$, $R_1$ is $C_6H_{13}$, and $R_2$ is $C_7H_{14}$ in this embodiment.

In accordance with an embodiment as described herein, it has been demonstrated that a polymer compound as shown in FIG. 1A has a reduced toxicity risk by using a polyurethane structure—hence introducing nitrogen into the molecule—on a reacted hydroxy acid and a saturated carboxylic acid to advantageously provide a relatively higher metal content, a relatively lowered molecular weight, lowered water solubility, and solubility in a low-VOC solvent. In one embodiment, a polymer compound is formed from reactants including a hydroxy acid, a saturated carboxylic acid, a metal hydroxide, and an isocyanate. In a further example, the hydroxy acid is ricinoleic acid, the saturated carboxylic acid is neodecanoic acid, the metal hydroxide is cobalt hydroxide or manganese hydroxide, and the isocyanate is isophorone diisocyanate (IPDI). In another example, the saturated carboxylic acid is ramified on the alpha carbon atom.

According to one embodiment as described in the present disclosure, a polymer compound comprises a metal-bearing urethanized polymer having a metal content greater than 6% by weight, and a water solubility according to OECD 105 below 20 mg/l, wherein the urethanized polymer is soluble in a low-VOC solvent.

In further examples of the polymer compound described above: the urethanized polymer is soluble in printing inks including hydrocarbon resins, alkyd resins, or any mixture thereof; the low-VOC solvent is an ester solvent; the ester solvent is at least one member from the group consisting of lactate esters (e.g., ethyl lactate, methyl lactate, or another ester of lactic acid with an alcohol) and fatty acid esters (e.g., butyl linoleate); the metal is an integral part of a backbone of the polymer compound; the metal is selected from the group consisting of cobalt, manganese, calcium, bismuth, strontium, and iron; the metal content is between about 6% and about 8% by weight; the overall viscosity of mixture of a solvent diluted polymer compound is below 3000 cP at 20° C. (e.g., measured with Brookfield cone and plate viscometers spindle 2); the urethenized polymer has a mean molecular weight less than 2000 Da; or combinations of the aforementioned examples.

Advantageously, the polymer compounds as disclosed herein have resulted in a narrower molecular weight distribution in the polymer compound, thereby providing polymer compounds with better solubility and hence lower viscosity in the same solvent, allowing for easier dispersion in a coating, paint or ink system. Furthermore, the choice of suitable solvents has become much larger than previously possible, such that environmentally-friendly and low-VOC solvents can now be used.

The advantages of these new polymer compounds versus previous compounds can be shown as follows. Whereas the previous compounds were marketed at a metal content up to 4% w/w (higher metal contents resulted in unpractical viscosities and difficult product handling), the new compounds as described herein are made (e.g., in the case of cobalt and manganese) at a metal content greater than 6% w/w (weight percentage) for improved efficacy of the polymer compound. Moreover, the solvent, instead of a glycol derivative like hexylene glycol which has been previously required, can now be replaced by an environmentally-friendly, low-VOC solvent, such as ethyl lactate. As the maximum concentration of VOC solvent in alkyd paints is limited, this is a considerable advantage for the alkyd paint formulator.

As previous products were formulated using a combination of dimer acids and monomeric fatty acids as main starting materials, the previous polymeric substances had very broad molecular weight distributions. Polymerization was obtained through balancing the proportions of dimer acids and fatty acids, followed by esterification or urethanisation. Dimer acids are in themselves a complex mixture of monomeric fatty acids, real dimer acids, trimer acids and even some high molecular weight compounds. Starting from such complex materials disadvantageously resulted in a broad spectrum of molecules, where especially the high molecular weight components have a negative effect on viscosity, solubility, and compatibility, and the low molecular weight components in the mixture have a negative effect on water solubility.

Advantageously, the polymer compounds as described in the present disclosure are formed from mixtures of hydroxy acids, saturated carboxylic acids, and/or unsaturated fatty acids, reacted with a metal hydroxide, and then further reacted with an isocyanate. Thus, carboxylic acids without a hydroxy function may be utilized. After urethanisation, the obtained mixtures have: (1) a very low content of low molecular weight species; and (2) the desired low water solubility is obtained without high amounts of high molecular weight fractions.

It is noted that a polymer compound "for use as a polymerization agent" has to be at least partially soluble in the targeted coatings, paints and inks, which are typically based on organic compounds, in particular on oils such as vegetable oils. The mean molecular weight can be estimated from the remaining free functionalities of the polymer and or the polymer synthesis sequences, or by an appropriate analytical technique, such as gel permeation chromatography (GPC). Fatty acids are the preferred carboxylic acids, as such alkyd type polymers are more compatible with the alkyd binders used in paints and inks. The polymer compound may be unsaturated to increase its solubility in unsaturated binders for paints or inks, and to participate in the drying process not only as a catalyst. According to one embodiment, the polymer compound is completely soluble in printing ink media such as hydrocarbon or alkyd resins, or any mixture thereof.

The metal atoms in the polymer compounds as described herein, for example, cobalt, manganese, calcium, bismuth, strontium, or iron atoms, are preferably an integral part of the backbone of the polymer. In other words, the metal atoms form bonds in the backbone chain of polymers. Such bound metal imparts its full catalytic effect to the polymer, while its water solubility is greatly suppressed. In one embodiment, the urethanized backbone is aliphatic or aromatic. Furthermore, the polymer compounds described in the present disclosure are typically unsaturated, although saturated forms are also possible. The unsaturated forms have the advantage of copolymerizing with the main binder in the system resulting in an even lower water solubility of the dried paint which is an advantage on the toxicological side.

In one example, the polymer compounds described in the present disclosure are characterized by including a metal-bearing urethanized polymer having the following formula below and as shown in FIG. 1A:

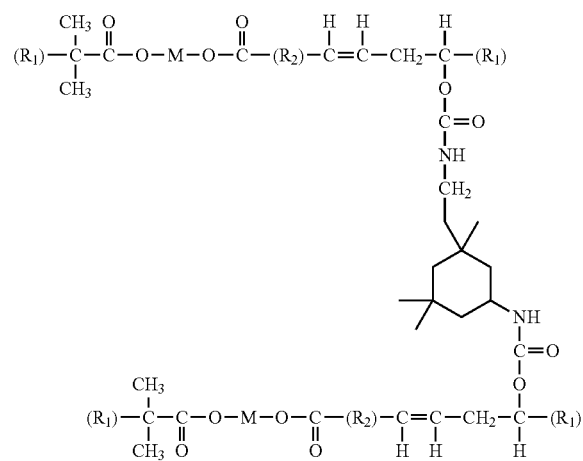

wherein M is a metal; $R_1$ is a first alkyl group; and $R_2$ is a second alkyl group.

In accordance with one embodiment, the metal M is selected from the group consisting of cobalt, manganese, calcium, bismuth, strontium, and iron, the first alkyl group $R_1$ includes 6 carbon atoms, and the second alkyl group $R_2$ includes 7 carbon atoms.

In accordance with further embodiments, the polymer compound with a formula as described above may have any one of the following, which may be alternatives that can be combined in various applicable and functional combinations: the metal-bearing urethanized polymer has a metal content greater than 6% by weight, and a water solubility according to OECD 105 below 20 mg/l, wherein the urethanized polymer is soluble in a low-volatile organic compound (low-VOC) solvent; the low-VOC solvent is an ester solvent; the ester solvent is at least one member from the group consisting of a lactate ester and a fatty acid ester; the urethanized polymer is soluble with the low-VOC solvent to form a mixture having an overall viscosity less than 3000 cP at 20° C.; the urethanized polymer is soluble in printing inks including hydrocarbon resins, alkyd resins, or any mixture thereof; the metal is an integral part of a backbone of the polymer compound; the metal is selected from the group consisting of cobalt, manganese, calcium, bismuth, strontium, and iron; the metal is cobalt or manganese and the metal content is between 6% and 8% by weight; the urethanized polymer is formed at least in part from a hydroxy acid, a saturated carboxylic acid, a metal hydroxide, and an isocyanate; the hydroxy acid is ricinoleic acid, the carboxylic acid is neodecanoic acid, the metal hydroxide is cobalt hydroxide or manganese hydroxide, and the isocyanate is isophorone diisocyanate (IPDI); and any applicable combination thereof.

In an embodiment, the metal-bearing urethanized polymer has a metal content greater than 6% by weight, and a water solubility according to OECD 105 below 20 mg/l, wherein the urethanized polymer is soluble in a low-volatile organic compound (low-VOC) solvent. Other alternative components and descriptions of the polymer, such as those described above, are within the scope of the present invention as noted herein.

In another example, the metal M is $Co^{2+}$, a first alkyl group $R_1$ is $C_6H_{13}$, and a second alkyl group $R_2$ is $C_7H_{14}$, as shown below and in FIG. 1B.

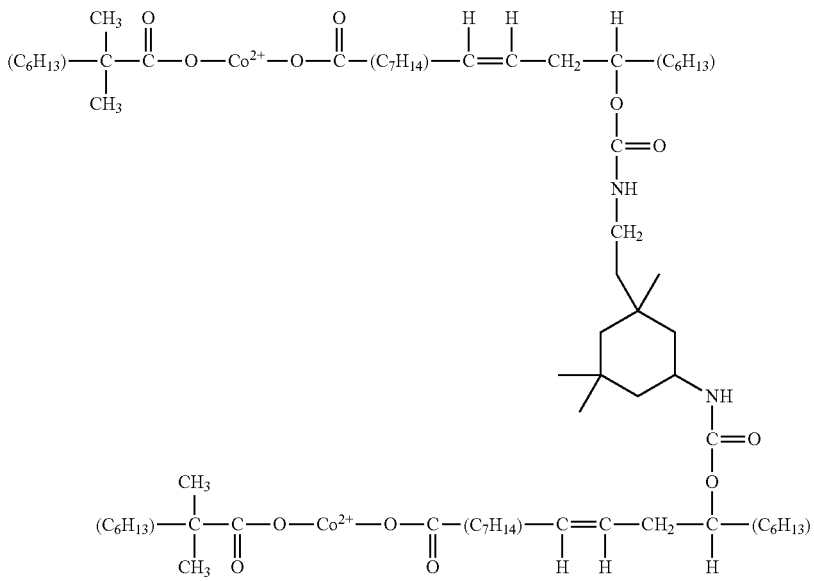

Compositions

Another embodiment as described in the present disclosure pertains to a series of coating, paint and ink compositions comprising a polymer compound as described herein as a curing catalyst. In one embodiment, a coating composition comprises a binder mixed with a polymer compound as described herein.

In one embodiment, a binder polymer is selected from the group consisting of alkyd polymers and alkyd-oil combinations.

A further embodiment concerns coating formulations wherein a metal-bearing urethanized polymer compound as described herein is used as the sole drier in a paint or ink system. In one example of a cobalt-bearing or a manganese-bearing urethanized polymer compound, the resulting metal concentration in a ready-to-use paint or ink is typically in the range of 0.05% to 0.1% by weight, calculated on the weight of the auto-oxidative binder in the system.

In a further embodiment of compositions, a composition may include a first metal-bearing urethanized polymer compound and can optionally include a second metal-bearing compound, with the first metal and the second metal being different metals. In one example, the first metal may be manganese and the second metal may be cobalt. The cobalt-bearing compound may include a cobalt carboxylate or a polymeric cobalt carboxylate. The binder preferably comprises an unsaturated fatty acid modified polymer. The polymer compound may be adapted so as to co-polymerize with this binder.

According to one embodiment, compositions are advantageously prepared as solutions in a low-VOC solvent or a mix of various low-VOC solvents. The solvent(s) for instance can be one or more from the group consisting of lactate esters (e.g., ethyl lactate, methyl lactate, or another ester of lactic acid with an alcohol) and fatty acid esters (e.g., butyl linoleate).

Metal-bearing urethanized polymer compounds as described herein are also applicable to composites for use as curing agents in unsaturated polyesters. Advantageously, compounds as described herein provide efficient and homogenous dispersion in unsaturated polyester based matrices of composites and provide efficient curing thereof. Differently than in coating, paint and ink applications where the oxygen from the ambient serves as an initiator, a peroxide initiator is needed for composites applications to initiate the curing.

It is noted that the various components that make up the polymer compound or the various components that describe the polymer compound disclosed above can be alternatives which may be combined in various applicable and operable combinations within the scope of the present invention.

General Synthesis Process

One embodiment as described in the present disclosure pertains to processes for preparing the polymer compounds as described herein. The processes are based on forming a mixture of a hydroxy acid and a saturated carboxylic acid, and reacting the mixture with a metal-bearing raw material, thereby obtaining an intermediate compound. Next, the intermediate compound is further reacted with an isocyanate (e.g., a polyfunctional isocyanate). Advantageously, hydroxy acids are polymerized with divalent metal ions and further reacted with isocyanates in one embodiment, thus allowing for both carboxylic acid functionality and hydroxyl groups in the same molecule.

Figure 2:
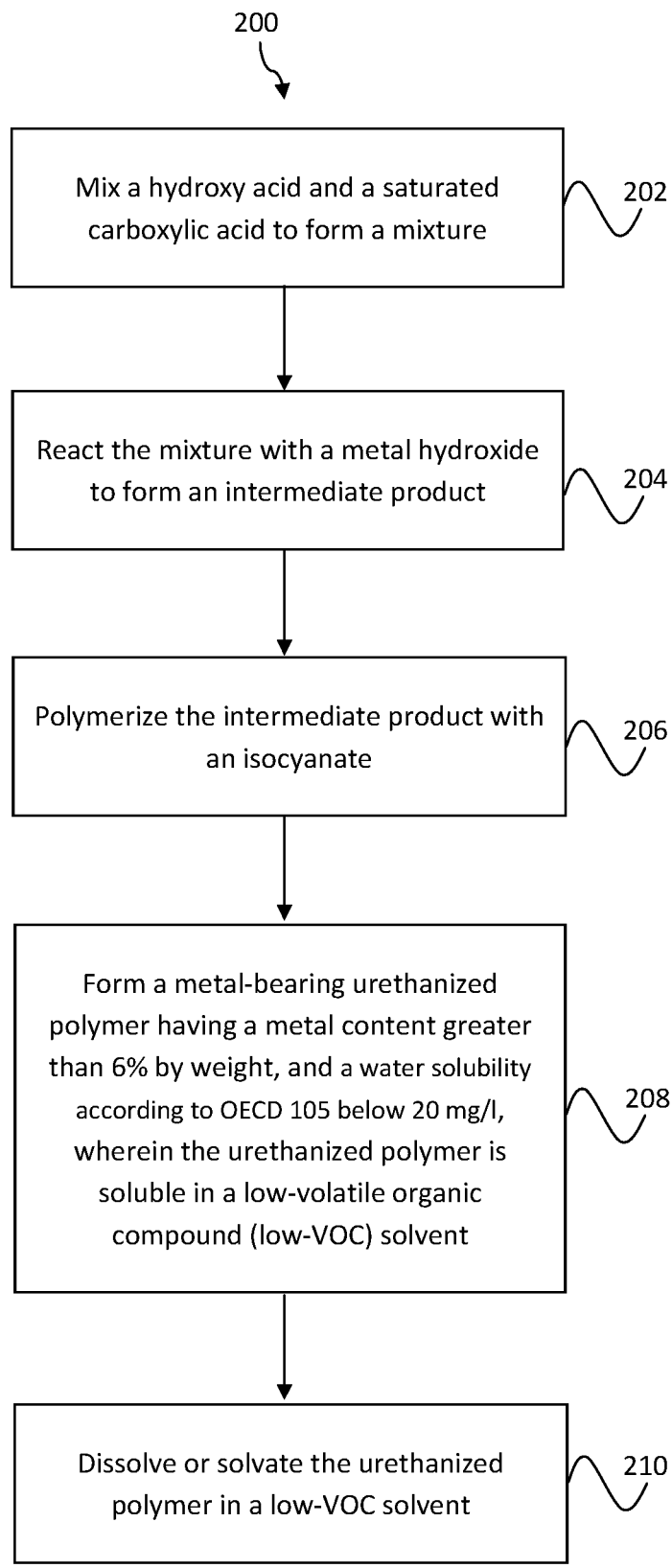
FIG. 2 is a flowchart of a method of preparing the polymer compounds in accordance with an embodiment as described in the present disclosure.

Referring now to FIG. 2, a flowchart of a method 200 is shown for preparing the polymer compounds in accordance with an embodiment as described in the present disclosure. Method 200 includes mixing a hydroxy acid and a saturated carboxylic acid to form a mixture at step 202, and then reacting the mixture with a metal hydroxide to form an intermediate product at step 204. Method 200 further includes polymerizing the intermediate product with a polyfunctional isocyanate at step 206 to thereby form a metal-bearing urethanized polymer having a metal content greater than 6% by weight, and a water solubility according to OECD 105 below 20 mg/l, wherein the urethanized polymer is soluble in a low-VOC solvent at step 208. Finally, the urethanized polymer is dissolved or solvated in a low-VOC solvent at step 210.

In one embodiment, the mixture of hydroxy acid and carboxylic acid at step 202 is formed of 50%-80% by weight hydroxy acid and of 20%-50% by weight carboxylic acid.

In one embodiment, the hydroxy acid is ricinoleic acid, the saturated carboxylic acid is neodecanoic acid, the metal hydroxide is cobalt hydroxide or manganese hydroxide, and the isocyanate is isophorone diisocyanate (IPDI).

In other embodiments, the hydroxy acid may be at least one member from the group including ricinoleic acid or a synthetic acid bearing methylol or ethylol groups.

In other embodiments, the saturated carboxylic acid may be at least one member from the group including neodecanoic acid, isononanoic acid, and bis(2-ethylhexanoic) acid.

In yet another embodiment, method 200 includes dissolving the urethanized polymer in a low-VOC solvent, wherein the low-VOC solvent is at least one member from the group consisting of lactate esters (e.g., ethyl lactate, methyl lactate, or another ester of lactic acid with an alcohol) and fatty acid esters (e.g., butyl linoleate).

In one embodiment, a metal-bearing raw material is cobalt hydroxide or a manganese salt or oxide, such as manganese (II) acetate tetrahydrate in one example. In other embodiments, this reaction scheme is applicable to any multivalent metal that can be obtained in a reactive form. Metals such as calcium (Ca), bismuth (Bi), strontium (Sr), and iron (Fe) can also be used besides the cobalt (Co) and manganese (Mn) previously mentioned above. In one example, a polymer compound may include bismuth used as a urethane gelling catalyst.

The further polymerization is then carried out with a polyfunctional isocyanate, commonly a bi-functional isocyanate, and in one example is isophorone di-isocyanate (IPDA). Other suitable isocyanates include but are not limited to toluene di-isocyanate (TDI), hexamethylene di-isocyanate (HDI), and the like. Mixtures of di- and mono-isocyanates (e.g., methylene isocyanate) can also be used to control the average molecular weight.

The composition can also be modified by adding non-metal bearing polymers as diluents. Solvents can be left in, removed or changed over to adjust the final viscosity of the ready-to-use product.

To be usable for the purposes as described, the final product is soluble in the majority of the polymers that are used in the manufacture of coatings, paints and inks.

There are several methods known to determine the molecular weight of these kinds of compounds. A primary method used is the normal Gel Permeation Chromatography (GPC) method. Analyses were performed on a polystyrene column, with samples diluted in tetrahydrofurane. Polystyrene standards were used for calibration, and afterwards the method was checked on normal vegetable oils and bodied oils for verification. Prior to injection, samples may be decomposed and molecular weights calculated back to the original substance.

Preparations normally resulted in polymer compounds including a metal-bearing urethanized polymer having a metal content greater than 6% by weight, and a water solubility according to OECD 105 below 20 mg/l, wherein the urethanized polymer was soluble in a low-VOC solvent. In some examples, the urethanized polymer also was synthesized to have a mean molecular weight less than about 2000 Da.

Thus, polymeric urethanised metal-bearing complexes with low water solubility may be formulated on the basis of hydroxy acids and saturated carboxylic acids reacted with a metal compound and afterwards further reacted with an isocyanate, with the reaction product being soluble in ester solvents.

Alternatively, polymeric urethanised metal-bearing complexes with low water solubility may be formulated on the basis of hydroxy acids, fatty acids, saturated carboxylic acids, reacted with a metal compound, and afterwards reacted with an isocyanate, with the reaction product being soluble in ester solvents.

Synthesis Examples of Metal-Bearing Polymer Compounds

Example 1

In a cylindrical reaction flask with heating and cooling possibility, equipped with a heated high torque stirrer and under nitrogen blanket, a mix was made of 293 grams of ricinoleic acid and 75 grams of neodecanoic acid. The ricinoleic acid and neodecanoic acid were charged and slowly heated until a temperature of 120° C. was reached to form a mixture.

When the temperature reached 120° C., 60 grams of cobalt hydroxide was fed gradually to the mixture until the temperature reached 180° C. When the addition of cobalt hydroxide was complete, the reactor was set to 210° C. and stirred for one hour under vacuum to form an intermediate compound.

The intermediate compound was cooled down to 120° C., and then 30 grams of isophorone diisocyanate (IPDI) was added. After half an hour of reaction, the content was cooled to 80° C. to form a cobalt-bearing urethanized polymer compound. 170 grams of ethyl lactate, advantageously a low-VOC solvent, was then added and the mixture was cooled to room temperature.

The formed cobalt-bearing urethanized polymer compound was a viscous and purple colored liquid product with a cobalt content greater than 6% by weight, a mean molecular weight of about 2000 Da, and a mean viscosity of about 2500 cP. From a sample, solvent was removed under high vacuum and the water solubility tested according to OECD 105. The water solubility was 11 mg/l after 24 hours stirring at 20° C.

Example 2

In a cylindrical reactor of 1 liter capacity with heating and cooling possibility, equipped with an inert gas inlet, product inlets, and a heated high torque stirrer, 520 grams of ricinoleic acid was charged. The acid was brought under inert atmosphere with ample nitrogen flow, the stirrer was started, and the reactor was brought to a temperature of 100° C.

Slowly 81.6 g of commercially available cobalt hydroxide was added. As the viscosity of the reaction product increased, the temperature was raised and stirrer power was adjusted. Reaction water was collected through a condenser and checked for weight. At the end of the reaction, the temperature was 180° C. and was kept there for 1 hour.

The reaction mixture was then cooled with the slow addition of anhydrous ethyl lactate until a free flowing dark purple liquid was obtained at a temperature between 80° C. and 90° C. Then 45 g of isophorone di-isocyanate was added in three portions over a period of 1 hour, and the mixture was kept at constant temperature for 2 hours. The product was then sampled and checked for remaining free isocyanate using FTIR equipment. When no free isocyanate could be detected, then the product was discharged, filtered, measured for cobalt content, and adjusted for 6% cobalt w/w with additional ethyl lactate.

A sample was prepared removing the solvent under high vacuum. The reaction product was then measured for water solubility according to OECD 105, and a value of 8 mg Co/l was found after 24 hours stirring at 20° C.

Example 3

Using the same equipment as described above with respect to Example 2, 360 grams of ricinoleic acid and 91 grams of neodecanoid acid were together charged, and using substantially the same procedure as described above with respect to Example 2, 81.6 grams of cobalt hydroxide was charged and reacted with the mixture of ricinoleic acid and neodecanoid acid. Finally, the reaction was completed with 45 grams of isophorone di-isocyanate. The reaction product was diluted with anhydrous ethyl lactate to a concentration of 6% cobalt w/w.

The reaction product was measured for water solubility according to OECD 105, and a value of 13 mg Co/l was found after 24 hours stirring at 20° C.

Example 4

In a cylindrical reactor of 1 liter capacity with heating and cooling possibility, equipped with an inert gas inlet, product inlets, and a heated high torque stirrer, 520 grams of ricinoleic acid was charged. The acid was brought under inert atmosphere with ample nitrogen flow, the stirrer was started, and the reactor was brought to a temperature of 100° C.

Slowly 207 grams of manganese (II) acetate tetrahydrate was charged and reacted with the ricinoleic acid. As the viscosity of the reaction product increased, the temperature was raised and stirrer power was adjusted. Reaction water was collected through a condenser and checked for weight. At the end of the reaction, the temperature was 180° C. and was kept there for 1 hour.

Removal of acetic acid was pushed with nitrogen flow under reduced pressure. The reaction mixture was then cooled with the slow addition of anhydrous ethyl lactate until a free flowing dark purple liquid was obtained at a temperature between 80° C. and 90° C. Then 45 g of isophorone di-isocyanate was added in three portions over a period of 1 hour, and the mixture was kept at constant temperature for 2 hours. The product was then sampled and checked for remaining free isocyanate using FTIR equipment. When no free isocyanate could be detected, then the product was discharged, filtered, measured for cobalt content, and adjusted for 6% manganese w/w with additional anhydrous ethyl lactate.

Product was measured for water solubility according to OECD 105, and a value of 5 mg Mn/l was found after 24 hours stirring at 20° C.

Example 5

Using the same equipment as described above with respect to Example 4, 360 grams of ricinoleic acid and 91 grams of neodecanoic acid were charged together. Using substantially the same procedure as described above with respect to Example 4, 207 g of manganese (II) acetate tetrahydrate were charged and reacted. Finally the reaction was completed with 45 g of isophorone di-isocyanate. The reaction product was diluted with anhydrous ethyl lactate to a manganese content of 6% w/w.

The reaction product was measured for water solubility according to OECD 105, and a value of 16 mg Mn/l was found after 24 hours stirring at 20° C.

Table 1 below summarizes drying performance of substances obtained in Examples 1 through 3 with a standard long oil alkyd resin (70% solids). A standard mix of Co—Ca—Zr (metal contents were fixed) with 0.013% Cobalt, 0.06% Calcium, 0.06% Zirconium was used. The solids content of paint formulation was 65% with a pigment volume concentration of 18%. A high speed disperser with a 23 m/sec speed was used to stir the mixes for 30 minutes. Tests were run at 25° C. and at 55% relative humidity.

TABLE 1

| COBALT COMPOUND | SURFACE DRYING TIME | THROUGH DRYING TIME |
|---|---|---|
| Example 1 | 1 hour | 3 hours 20 min |
| Example 2 | 1 hour 10 min | 3 hours 30 min |
| Example 3 | 1 hour 30 | 3 hours 30 min |
| Cobalt Octoate | 1 hour 10 min | 3 hours 20 min |

Table 2 below summarizes the performance of the substances of examples 1 through 5 as a polyester curing accelerator. 100 parts of unsaturated polyester resin was mixed with 0.2 phr (per hundred resin) cobalt 2-ethylhexanoate (4% cobalt) standard polyester curing accelerator (catalyst). After the sample was brought to 25° C. in a water bath, 2 phr of Butanox M 60 polyester initiator from AkzoNobel was mixed in the preparation and the gel time, the peak time, the gel temperature, and the final appearance were recorded. The same was repeated for substances of Example 1 through 3 instead of cobalt 2-ethylhexanoate (4% cobalt) standard.

TABLE 2

| COBALT COMPOUND | GEL TIME | PEAK TIME | PEAK TEMP | APPEARANCE |
|---|---|---|---|---|
| Example 1 | 17 min 10 sec | 29 min 25 sec | 147° C. | Clear light purple |
| Example 2 | 16 min 33 sec | 31 min 17 sec | 144° C. | Clear light purple |
| Example 3 | 14 min 34 sec | 32 min 48 sec | 142 C. | Clear light purple |
| Cobalt Octoate | 15 min 27 sec | 33 min 52 sec | 145° C. | Clear light purple |

Use of Compounds

An embodiment as described in the present disclosure pertains to the use of the polymer compounds as described herein as catalysts for drying of coatings, paints and inks based on unsaturated polymers.

Figure 3:
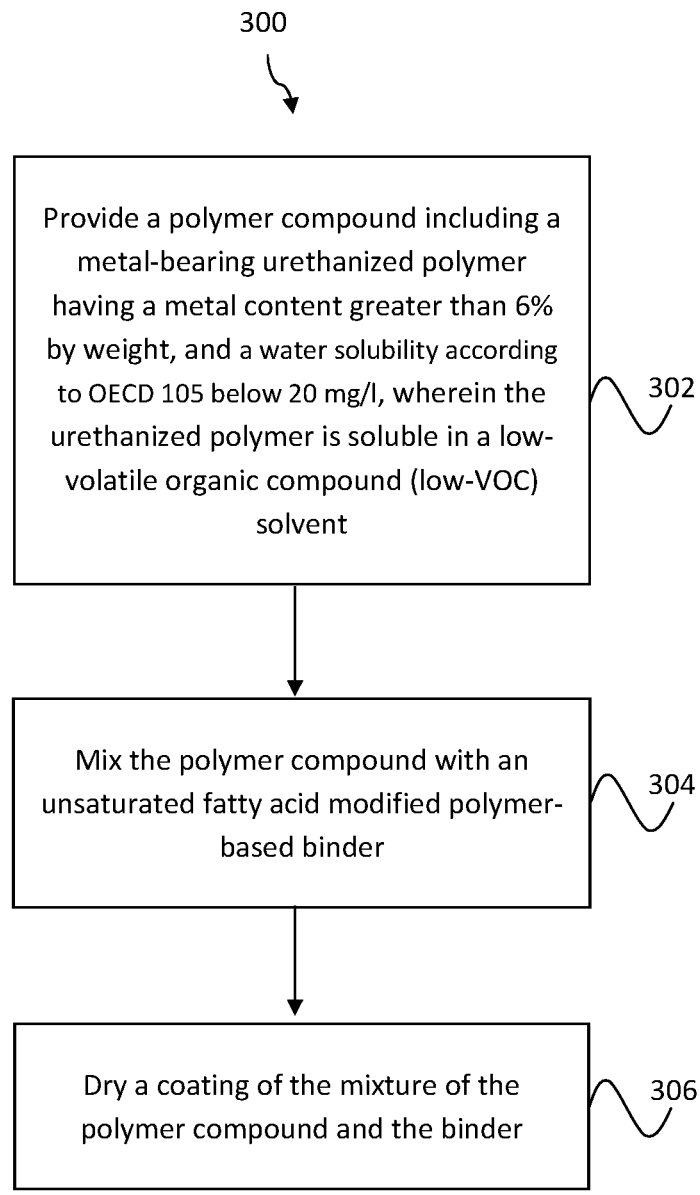
FIG. 3 is a flowchart of a method of curing a polymer-based coating composition in accordance with an embodiment as described in the present disclosure.

Referring now to FIG. 3, a flowchart of a method 300 is shown for curing a polymer-based coating composition in accordance with an embodiment as described in the present disclosure. Method 300 includes at step 302 the providing of a polymer compound including a metal-bearing urethanized polymer having a metal content greater than 6% by weight, and a water solubility according to OECD 105 below 20 mg/l, wherein the urethanized polymer is soluble in a low-volatile organic compound (low-VOC) solvent. Method 300 further includes mixing the polymer compound with an unsaturated fatty acid modified polymer-based binder at step 304, and drying the mixture of the polymer compound and the binder at step 306. A low-VOC solvent may be used as applicable within this method.

Another embodiment pertains to use of the cobalt-bearing polymer compounds as described herein as curing catalysts for hardening of unsaturated polyesters.

Within the scope of the present invention, the following descriptions are applicable as alternatives in any operable combination with all the embodiments of the polymer compounds and their preparation and use described above: the urethanized polymer is soluble in printing inks including hydrocarbon resins, alkyd resins, or any combination thereof; the low-VOC solvent is an ester solvent; the ester solvent is at least one member from the group consisting of a lactate ester, a fatty acid ester, and any combination thereof; the metal is an integral part of a backbone of the polymer compound; the metal is selected from the group consisting of cobalt, manganese, calcium, bismuth, strontium, and iron; the metal is cobalt or manganese and the metal content is between 6% and 8% by weight; the urethanized polymer is soluble with the low-VOC solvent to form a mixture having an overall viscosity less than 3000 cP at 20° C.; the urethenized polymer has a mean molecular weight less than 2000 Da; the urethanized polymer is formed at least in part from a hydroxy acid, a saturated carboxylic acid, a metal hydroxide, and an isocyanate; the hydroxy acid is ricinoleic acid, the carboxylic acid is neodecanoic acid, the metal hydroxide is cobalt hydroxide or manganese hydroxide, and the isocyanate is isophorone diisocyanate (IPDI); and any applicable combination thereof.

Advantageously, the polymer compound of the present invention is soluble in an environmentally-friendly "green" solvent, which in one example may be bioderived, biodegradable, and/or have a low VOC content. Thus, the urethanized polymer compounds of the present invention, methods of preparing such compounds, and use of such compounds, as disclosed herein, greatly avoids toxic effects by reducing the availability of the metal ions in aqueous systems (through low water solubility) and being soluble in a "green" (e.g., biodegradable) and low-VOC solvent, while providing for increased metal content for enhanced catalytic, drying, modifier, and/or accelerator functionality.

The foregoing examples have been provided merely for the purpose of explanation and are in no way to be construed as limiting of the present invention. While the present invention has been disclosed with reference to embodiments, the words used herein are intended to be words of description and illustration, rather than words of limitation. While the present invention has been described with reference to particular materials and embodiments, the present invention is not intended to be limited to the particulars disclosed herein. For example, the various components that make up the polymer compound or the various components that describe the polymer compound disclosed above can be alternatives which may be combined in various applicable and functioning combinations within the scope of the present invention. Rather, the present invention extends to all functionally equivalent structures, materials, and uses, such as are within the scope of the appended claims. Changes may be made, within the purview of the appended claims, as presently stated and as may be amended, without departing from the scope and spirit of the present invention. All terms used in this disclosure should be interpreted in the broadest possible manner consistent with the context.

The invention claimed is:

1. A polymer compound for use as a polymerization agent in coatings, paints, or inks, the polymer compound comprising a metal-bearing urethanized polymer having the following formula:

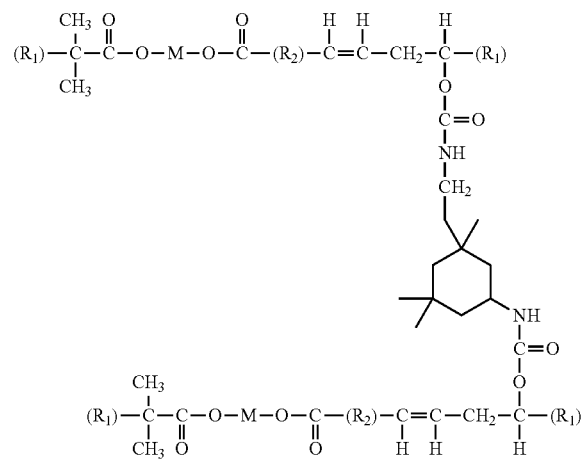

wherein

M is a metal;

$R_1$ is a first alkyl group; and $R_2$ is a second alkyl group, wherein metal-bearing urethanized polymer has a metal content between 6% and 8% by weight, and a water solubility according to OECD 105 below 20 mg/l, wherein the urethanized polymer is soluble in a low-volatile organic compound (low-VOC) solvent.

2. The polymer compound according to claim 1, wherein the metal M is selected from the group consisting of cobalt, manganese, calcium, bismuth, strontium, and iron, wherein the first alkyl group $R_1$ has 6 carbon atoms, and wherein the second alkyl group $R_2$ has 7 carbon atoms.

3. The polymer compound according to claim 1, wherein the low-VOC solvent is an ester solvent.

4. The polymer compound according to claim 3, wherein the ester solvent is at least one member selected from the group consisting of a lactate ester and a fatty acid ester.

5. The polymer compound according to claim 3, wherein the urethanized polymer is soluble with the solvent to form a mixture having an overall viscosity less than 3000 cP at 20° C.

6. The polymer compound according to claim 1, wherein the urethanized polymer is soluble in printing inks including hydrocarbon resins, alkyd resins, or any mixtures thereof.

7. The polymer compound according to claim 1, wherein the metal is selected from the group consisting of cobalt, manganese, calcium, bismuth, strontium, and iron.

8. The polymer compound according to claim 1, wherein the metal is cobalt or manganese.

9. The polymer compound according to claim 1, wherein the urethanized polymer is formed at least in part from a hydroxyl acid, a saturated carboxylic acid, a metal hydroxide, and an isocyanate.

10. The polymer compound according to claim 9, wherein the hydroxyl acid is ricinoleic acid, the carboxylic acid is neodecanoic acid the metal hydroxide is cobalt hydroxide or manganese hydroxide, and the isocyanate is isophorone diisocyanate (IPDI).

11. A process for preparing the polymer compound according to claim 1, the process comprising:
mixing a hydroxy acid and a saturated carboxylic acid to form a mixture;
reacting the mixture with a metal hydroxide to form an intermediate product; and
polymerizing the intermediate product with an isocyanate to form a metal-bearing urethanized polymer having a metal content between 6% and 8% by weight, and a water solubility according to OECD 105 below 20 mg/l, wherein the urethanized polymer is soluble in a low-volatile organic compound (low-VOC) solvent.

12. The process according to claim 11, wherein the hydroxy acid is ricinoleic acid, the carboxylic acid is neodecanoic acid, the metal hydroxide is cobalt hydroxide or manganese hydroxide, and the isocyanate is isophorone diisocyanate (IPDI).

13. The process according to claim 11, further comprising dissolving the urethanized polymer in a low-VOC solvent, wherein the low-VOC solvent is at least one member selected from the group consisting of a lactate ester, a fatty acid ester, and any combination thereof.

14. The process according to claim 11, wherein the urethanized polymer is soluble with the solvent to form a mixture having an overall viscosity less than 3000 cP at 20° C.

15. The process according to claim 11, wherein the mixture is formed of 50%-80% by weight hydroxy acid and of 20%-50% by weight carboxylic acid.

16. A method of curing a polymer-based coating composition, the method comprising:
providing a polymer compound according to claim 1,
mixing the polymer compound with an unsaturated fatty acid modified polymer-based binder; and
drying a coating of the mixture of the polymer compound and the binder.

* * * * *